(12) United States Patent
Cassidy

(10) Patent No.: US 6,604,318 B1
(45) Date of Patent: Aug. 12, 2003

(54) METHOD AND APPARATUS FOR EXTERMINATING ANT COLONIES UTILIZING CARBON DIOXIDE

(76) Inventor: Roger Ray Cassidy, 3671 W. - 122nd Ave., Allegan, MI (US) 49010

( * ) Notice: Subject to any disclaimer, the term of this patent is extended or adjusted under 35 U.S.C. 154(b) by 0 days.

(21) Appl. No.: 10/075,662

(22) Filed: Feb. 15, 2002

(51) Int. Cl.[7] ................................................ A01M 1/20
(52) U.S. Cl. ................................................ 43/132.1
(58) Field of Search ............................ 43/132.1, 124, 43/125

(56) References Cited

U.S. PATENT DOCUMENTS

| | | | |
|---|---|---|---|
| 3,370,571 A | | 2/1968 | Knapp |
| 4,026,330 A | | 5/1977 | Dunn |
| 4,240,802 A | | 12/1980 | Nichols, Jr. |
| 4,597,217 A | * | 7/1986 | Narita ........................ 43/124 |
| 4,624,070 A | | 11/1986 | Query et al. |
| 4,637,161 A | * | 1/1987 | Turner ........................ 43/130 |
| 4,640,044 A | * | 2/1987 | Varnon ...................... 126/714 |
| 4,648,202 A | * | 3/1987 | Renth ......................... 43/124 |
| 4,829,706 A | * | 5/1989 | Perry .......................... 43/125 |
| 4,833,818 A | * | 5/1989 | Berta .......................... 43/124 |
| 5,027,546 A | * | 7/1991 | Tallon ......................... 43/124 |
| 5,109,628 A | | 5/1992 | Ellefson |
| 5,109,629 A | | 5/1992 | King, Jr. et al. |
| 5,154,018 A | * | 10/1992 | Livingston .................. 43/125 |
| 5,309,669 A | * | 5/1994 | Jackson ...................... 43/124 |
| 5,394,643 A | * | 3/1995 | Schmittmann .............. 43/124 |
| 5,502,920 A | * | 4/1996 | Takaoka ..................... 43/124 |
| 5,588,252 A | | 12/1996 | Jones |
| 5,618,565 A | | 4/1997 | Thomas |
| 5,870,852 A | * | 2/1999 | Stanley ...................... 111/7.1 |
| 6,047,496 A | * | 4/2000 | Leitner et al. ............... 43/125 |
| 6,205,702 B1 | * | 3/2001 | Ammons ..................... 43/124 |
| 6,220,525 B1 | * | 4/2001 | McSherdon ................. 111/7.1 |

* cited by examiner

Primary Examiner—Charles T. Jordan
Assistant Examiner—Jordan Lofdahl
(74) Attorney, Agent, or Firm—Richard L. Mikesell

(57) ABSTRACT

A process for exterminating ants includes covering an ant mound with a dome configured to fit over the ant mound and having a lower lip for contacting the ground entirely around the ant mound. A carbon dioxide delivery system mounted to a top of the dome injects carbon dioxide into the dome and the ant mound to exterminate the ants. The carbon dioxide delivery system typically includes a pipe configured to hold the puncturable carbon dioxide container, and a hollow needle extending from the pipe and into the dome for injecting the carbon dioxide therein.

4 Claims, 1 Drawing Sheet

METHOD AND APPARATUS FOR EXTERMINATING ANT COLONIES UTILIZING CARBON DIOXIDE

BACKGROUND OF THE INVENTION

The present invention generally relates to the field of killing ants. More particularly, the invention relates to an apparatus and process for exterminating ant colonies utilizing carbon dioxide.

Fire ants have become well-established throughout the southern portion of the United States. They damage natural ecosystems, drive out other species and cause billions of dollars in damage to farms and ranches, to pastures and prairies, and in cities.

It is known to kill insects, such as ants, with pesticides such as Diazonon, Dursban, and Malathion. Such chemicals have well-known properties for killing insects on contact. Thus, it has been the practice to apply insecticides to the mound surface of a fire ant or harvester ant mound, with the intention of killing as many ants on the surface and which come into contact when insecticide is possible.

However, many ants survive deep in "rooms" of the subterranean colony. The ants oftentimes simply dose off the effected opening and burrow a new opening to the colony. Also, not all chemicals have been effective against fire ants. Those chemicals which have, unfortunately, in addition to killing the fire ants, have killed other forms of wildlife and can be dangerous to humans as well.

Accordingly, there is need for an apparatus and method for exterminating ants, and particularly fire ants, which does not rely upon the use of potentially dangerous chemicals. The present invention fulfills this need and provides other related advantages.

SUMMARY OF THE INVENTION

The present invention resides in an apparatus for exterminating ants using carbon dioxide. An ant mound is covered with a dome configured to fit over the ant mound and having a lower lip for contacting the ground entirely around the ant mound. Preferably, the dome is comprised of a clear plastic material. A carbon dioxide delivery system is mounted to a top of the dome such that carbon dioxide is capable of being injected or otherwise delivered into the dome and the ant mound.

In a particularly preferred embodiment, the carbon dioxide delivery system comprises a pipe configured to hold a puncturable carbon dioxide container. A sharpened point extends upwardly into the cavity of the hollow pipe such that when the carbon dioxide container is placed therein the membrane is punctured. A cap is threadably received onto an end of the pipe to hold the carbon dioxide container, and the released gas, within the pipe. A hollow needle extends from the pipe and is placed into an aperture of the dome, such as by threading the needle into an aperture of the dome.

Thus, upon inserting the carbon dioxide container into the pipe and sealing the end thereof with the cap, carbon dioxide gas is released into the pipe and through the hollow needle and into the dome and ant mound. A flow control valve is preferably associated with the hollow needle to control the flow of carbon dioxide gas emitted from the system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figures 1, 2:
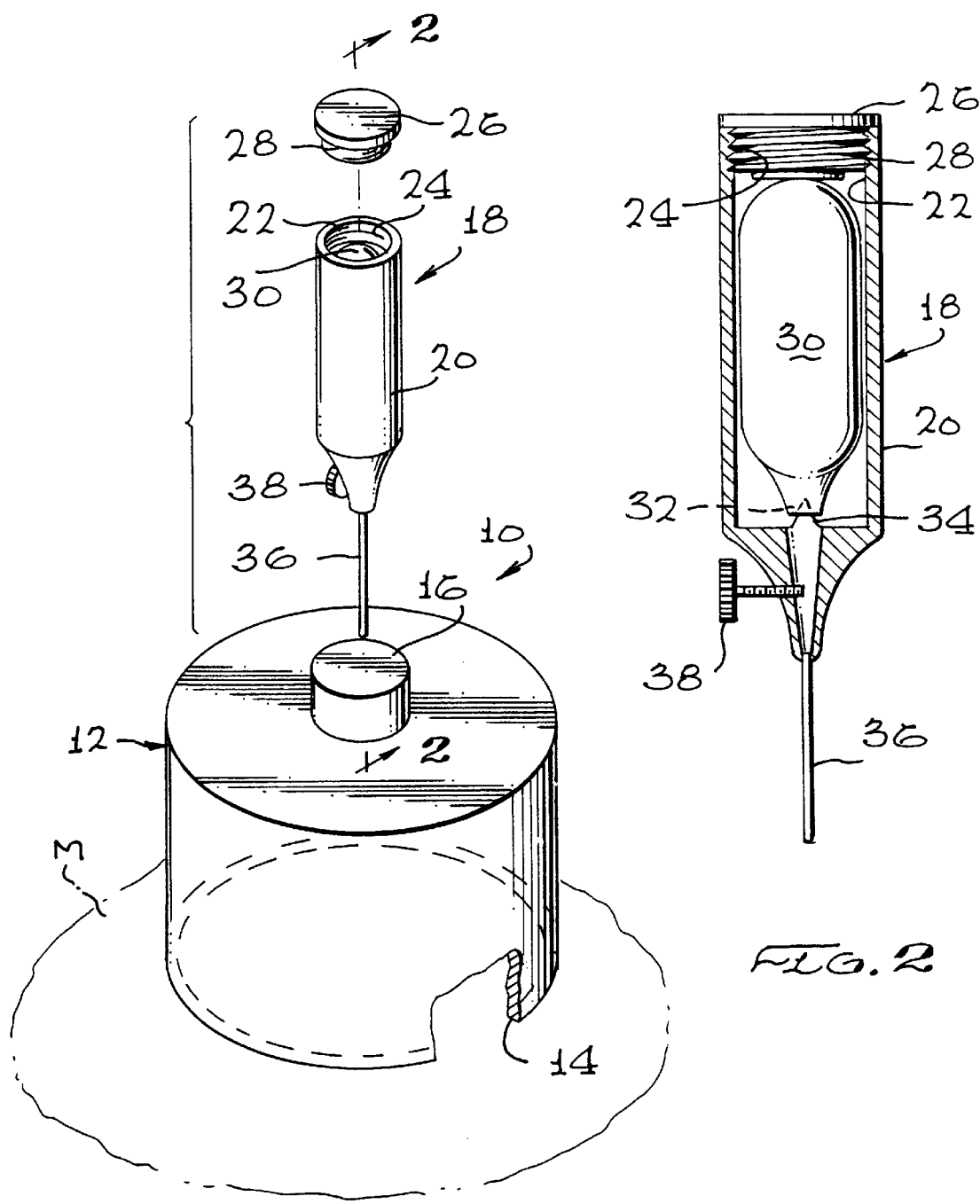
FIG. 1 is a broken away partially exploded perspective view of an apparatus for exterminating ants in accordance with the present invention.
FIG. 2 is a cross-sectional view taken generally along line 2—2, illustrating a preferred carbon dioxide delivery system embodying the present invention.

As shown in the accompanying drawings for purposes of illustration, the present invention resides in an apparatus, generally referred to by reference number 10, and related method for exterminating ants. As will be more fully described herein, the apparatus and process utilize carbon dioxide which is slowly released into the ant hill, it being believed that the ant hill will become cold and due to the fact that the carbon dioxide is heavier than oxygen will sink into the subterranean tunnels and rooms to kill all of the ants, including the queen ant, due to the lack of oxygen and decrease in temperature.

With reference now to FIG. 1, the apparatus 10 includes a dome 12 that is configured to fit over an ant mound M, or entry/exit hole of an ant colony. The dome is preferably circular or round and has a lower lip 14 for contacting the ground entirely around the ant mound. In a particularly preferred embodiment, the dome is comprised of a dear plastic which is durable and allows the process of the invention to be viewed therethrough. The dome includes a window or aperture 16 in an upper surface thereof through which carbon dioxide is injected into the dome and ant colony. The inlet 16 can comprise any inlet which allows the entry of carbon dioxide enlarged aperture sized to fit a carbon dioxide delivery system 18 mounted thereto, as will be described more fully herein.

Although various means of injecting carbon dioxide into the dome 12 are contemplated by the invention, in a particularly preferred embodiment, the system 18 comprises a hollow pipe 20, comprised of steel, plastic, or other durable material having an open end 22. This opening is preferably interiorally threaded 24 so as to accept a cap 26 having exterior threads 28 which are received by the interior threads 24 as the cap is twisted onto the pipe 20. The pipe 20 is sized such so as to accept a typical carbon dioxide canister 30. Such carbon dioxide canisters 30 include a puncturable membrane 32 at an end thereof. A sharpened point 34 extends upwardly from a bottom of the pipe 20 so as to be aligned with the membrane 32 of the carbon dioxide canister 30 as it is placed within the pipe 20. A hollow needle 36 extends from the pipe 20, forming a carbon dioxide exiting passageway. In a particularly preferred embodiment, a flow control valve 38 is associated with the needle 36, or passageway extending to the needle 36, for controlling the delivery of carbon dioxide from the canister 30 and out through the needle 36.

In use, the dome 12 is placed over the ant mound such that the lower lip 14 thereof completely encircles the ant mound and contacts the ground to prevent the entry of air into the dome 12 and mound. Carbon dioxide in then injected through the dome 12 and into the ant mound. This is typically done by inserting the carbon dioxide canister 30 into the pipe 20, and screwing cap 26 onto the open end of the pipe 20 such that carbon dioxide cannot escape through the open end 22 of the pipe 20, but instead is forced through the hollow needle 36. In fact, the system 18 can be designed such that the sharpened point 32 includes apertures which lead directly into the passageway of the hollow needle 36 such that carbon dioxide flows directly through the needle 36 and not into the interior of the pipe 20. The flow control valve can be turned off at this point until the system 18 is mounted to the control valve can be turned off at this point until the system 18 is mounted to the dome aperture 16, either by threading the needle into the aperture hole 16, or pushing the needle 36 and pipe 20 into frictional and mating contact with the aperture 16. As described above, the entry/aperture 16 of the dome may include a membrane which is punctured by the hollow needle 36 as well. The flow control valve 38 is then opened to controllably release carbon dioxide into the dome 12, which then is believed to sink into the ant colony and kill the ants as described above. As a typical carbon dioxide canister is under tremendous positive pressure, the flow control valve 38 allows a constant and controlled pressure of carbon dioxide to be emitted from the system 18. Otherwise, without the use of a flow control valve 38, the pressurized carbon dioxide will immediately vacate from the canister 30 and through the needle 36 and can blow debris into the ant mound openings such that the carbon dioxide does not adequately fill the ant colony.

The present invention is advantageous over other methods as it is a non-poisonous way to kill ants. After treatment, the apparatus 10 is removed from the ant mound and the remaining carbon dioxide dissipates into the atmosphere without adverse effect upon those around the ant mound.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A process for exterminating ants, comprising the steps of:
    covering an ant mound with a dome; and
    injecting carbon dioxide into the dome using a mounted a carbon dioxide delivery system on the top of the dome such that carbon dioxide is capable of being delivered into the dome and the ant mound;
    wherein the carbon dioxide delivery system comprises a pipe configured to hold a puncturable carbon dioxide container, and a hollow needle extending from the pipe, and wherein the mounting step comprises threading the needle into an aperture of the dome.

2. The process of claim 1, including the step of controlling the flow of carbon dioxide from the system using a flow control associated with the hollow needle.

3. An apparatus for exterminating ants, comprising:
    a dome comprised of a clear plastic material configured to fit over an ant mound, the dome having a lower lip for contacting the ground entirely around the ant mound; and
    a carbon dioxide delivery system which includes a pipe configured to hold a source of carbon dioxide, and a hollow needle extending from the pipe and inserted through an aperture of the dome mounted to a top of the dome such that carbon dioxide is capable of being delivered into the dome and the ant mound; and
    wherein the source of carbon dioxide comprises a carbon dioxide canister having a puncturable membrane, and wherein the pipe includes a sharpened point extending upwardly into a cavity thereof to puncture the carbon dioxide canister membrane.

4. An apparatus for exterminating ants, comprising:
    a dome configured to fit over an ant mound, the dome having a lower lip for contacting the ground entirely around the ant mound; and
    a carbon dioxide delivery system mounted to a top of the dome such that carbon dioxide is capable of being delivered into the dome and the ant mound, the carbon dioxide delivery system comprising:
        a hollow pipe having a sharpened point extending upwardly in a cavity thereof;
        a carbon dioxide canister having a puncturable membrane disposed within the pipe such that the membrane is punctured by the sharpened point;
        a hollow needle extending from the pipe and threadedly inserted through an aperture of the dome;
        a cap threadedly received onto an end of the pipe generally opposite the needle; and
    a flow control valve associated with the needle for altering the flow of carbon dioxide through the needle and into the dome.

* * * * *